United States Patent
Bowman (10) Patent No.: US 6,233,298 B1
(45) Date of Patent: *May 15, 2001

(54) APPARATUS FOR TRANSMUTATION OF NUCLEAR REACTOR WASTE

(75) Inventor: Charles D. Bowman, Los Alamos, NM (US)

(73) Assignee: ADNA Corporation, Los Alamos, NM (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/240,760

(22) Filed: Jan. 29, 1999

(51) Int. Cl.⁷ .............................. G21C 1/16; G21C 1/30; G21G 1/08

(52) U.S. Cl. .................... 376/171; 376/172; 376/174; 376/192; 376/195; 376/354; 376/359

(58) Field of Search ................................... 376/170, 171, 376/172, 173, 192, 193, 195, 354, 359

(56) References Cited

U.S. PATENT DOCUMENTS

| | | |
|---|---|---|
| 3,349,001 | 10/1967 | Stanton . |
| 4,309,249 | 1/1982 | Steinberg et al. . |
| 4,721,596 | 1/1988 | Marriott et al. . |
| 5,160,696 | 11/1992 | Bowman . |
| 5,499,276 | 3/1996 | Wakabayashi . |
| 5,513,226 | 4/1996 | Baxter et al. . |
| 5,545,797 | 8/1996 | Ewing et al. . |
| 5,768,329 | 6/1998 | Berwald . |
| 5,774,514 | 6/1998 | Rubbia . |

OTHER PUBLICATIONS

Bowman, C. D. et al., "Nuclear Energy Generation and Waste Transmutation Using an Accelerator–Driven Intense Thermal Neutron Source," LA–UR–91–2601, LANL, Los Alamos, 1991.*

Cokinons, D. et al., "Plutonium Burnup in a Subcritical Accelerator–Driven Blanket," BNL, New York, Jan. 1995.*

Van Tuyle, G. J. et al., "Accelerator–Driven Subcritical Target Concept for Transmutation of Nuclear Wastes," Nuclear Technology, vol. 101, Jan. 1993.*

Wilson, W. B. et al., "Transmutation Calculations for the Accelerator Transmutation of Waste (ATW) Program," NTIS #:DE91007392/XAB, (Abstract), LANL, Los Alamos, 1991.*

Relevant excerpts from *Nuclear Applications & Technology*, Feb., 1970, vol. 8.

* cited by examiner

Primary Examiner—Michael J. Carone
Assistant Examiner—Kyonytack K. Mun
(74) Attorney, Agent, or Firm—Brian J. Pangrle (57) ABSTRACT

A subcritical reactor-like apparatus for treating nuclear wastes, the apparatus comprising a vessel having a shell and an internal volume, the internal volume housing graphite. The apparatus having means for introducing a fluid medium comprising molten salts and plutonium and minor actinide waste and/or fission products. The apparatus also having means for introducing neutrons into the internal volume wherein absorption of the neutrons after thermalization forms a processed fluid medium through fission chain events averaging approximately 10 fission events to approximately 100 fission events. The apparatus having additional means for removing the processed fluid medium from the internal volume. The processed fluid medium typically has no usefulness for production of nuclear weapons.

18 Claims, 8 Drawing Sheets

APPARATUS FOR TRANSMUTATION OF NUCLEAR REACTOR WASTE

BACKGROUND OF THE INVENTION

1. Field of the Invention (Technical Field)

The present invention relates to transmutation of nuclear waste.

2. Background Art

Geologic storage of nuclear waste has been for the past thirty years the primary plan for permanent storage of nuclear waste worldwide. However, concerns about the effectiveness of confinement, the loss of the large energy content of the plutonium waste, the accumulation of thousands of tons of weapons-useful plutonium in the stored waste, and the possibility of recriticality of the waste in permanent storage have delayed the implementation of geologic storage worldwide. At present, no nation has Identified a permanent site for geologic storage of high-level nuclear waste and implementation of geologic waste storage anywhere is at least a decade away. Several nations have attempted to address this problem by destroying the waste using technologies such as mixed oxide (MOX) waste burning in conventional light water reactors (LWRs) or in fast breeder reactors converted for waste burning. While some gains are possible using these approaches, the impact on the waste problem is either minor or the time scale for making a significant impact is much longer than a human generation. Therefore there is no consensus that destruction of waste using conventional nuclear technology is practical for improving geologic storage significantly.

Over the last decade, scientists have proposed schemes for improved waste destruction using accelerator-driven reactor-like systems and some of these concepts have been patented. Typically, such systems offer gains by using an accelerator to supplement the number of neutrons beyond those available in an ordinary reactor and thereby to obtain more complete destruction or burn-up of the waste. An accelerator also may be used to allow operation outside of technical constraints imposed by the criticality requirement of normal reactors. The following patents disclose technology related to reduction and production of nuclear matter.

U.S. Pat. No. 5,774,514, entitled "Energy Amplifier for Nuclear Energy Production Driven by a Particle Beam Accelerator," to Rubbia, issued Jun. 30, 1998. This patent discloses a method for producing energy from a nuclear fuel material contained in an enclosure. A high energy particle beam is directed into the enclosure for interacting with a heavy nuclei target to produce high energy spallation neutrons, such target comprising bismuth and/or lead, wherein the bismuth and/or lead are in a molten state. The spallation neutrons are multiplied in steady subcritical fission conditions. This patent also discloses the use of a plurality of fuel bodies each encapsulated in a shell of a solid-phase moderator, such moderator comprising graphite.

U.S. Pat. No. 5,768,329, entitled "Apparatus for Accelerator Production of Tritium," to Berwald, issued Jun. 16, 1998. This patent discloses a process for preparing or breeding tritium gas from dense molten lithium alloy, such as an eutectic lead lithium alloy. The molten lithium alloy serves as a target material for a high energy particle beam whereby the beam's high energy protons interact with the target to generate a neutron flux. The molten state lead lithium alloy circulates past the beam impact area and through a heat exchanger to recover thermal energy.

U.S. Pat. No. 5,545,797, entitled "Method of Immobilizing Weapons Plutonium to Provide a Durable Disposable Waste Product," to Ewing et al., issued Aug. 13, 1996. This patent discloses a method of fixation and immobilization of plutonium whereby the plutonium is fixed in the form of either $PuO_2$ or $Pu(NO_3)_4$ and is mixed with $ZrO_2$ and $SiO_2$.

U.S. Pat. No. 5,513,226, entitled "Destruction of Plutonium," to Baxter et al., issued Apr. 30, 1996. This patent discloses a method of using plutonium in a manner so as to render it no longer suitable for employment in a device to create nuclear detonation. The first three steps of the ten step method comprise forming plutonium oxide spheroids, coating the spheroids with a multi-layer fission-product retentive coating and disposing the coated spheroids in a plurality of graphite block elements. Fissioning of the fissle plutonium nuclides occurs through neutrons primarily in the thermal range.

U.S. Pat. No. 5,499,276, entitled "Method for Minor Actinide Nuclides Incineration," to Wakabayashi, issued Mar. 12, 1996. This patent discloses a method of minor actinide incineration by adding neptunium of minor actinide nuclides separated from spent fuel to a reactor core fuel of a fast reactor and adding americium of the separated minor actinide nuclides and rare earth elements to radial and/or axial blankets and/or shield of the fast reactor.

U.S. Pat. No. 5,160,696, entitled "Apparatus for Nuclear Transmutation and Power Production using an Intense Accelerator-generated Thermal Neutron Flux," to Bowman, issued Nov. 3, 1992, expired Nov. 6, 1996 due to failure to pay maintenance fees. This patent discloses an apparatus using a high energy proton beam and a spallation target to generate high thermal neutron fluxes wherein the target comprises a high Z-material such as a liquid lead-bismuth eutectic mixture. The high thermal neutron fluxes are used to burn-up higher actinide nuclear waste and rapid burn-up of fission product waste.

U.S. Pat. No. 4,721,596, entitled "Method for Net Decrease of Hazardous Waste Materials," to Marriott et al., issued Jan. 26, 1988. This patent discloses a method for decreasing reactor waste materials through use of a thermal neutron flux whereby neutrons for transmutation are produced from a fission or non-fission, e.g., fusion, source.

U.S. Pat. No. 4,309,249, entitled "Neutron Source, Linear-Accelerator Fuel Enricher and Regenerator and Associated Methods," to Steinberg et al., issued Jan. 5, 1982. This patent discloses an apparatus for producing fissle material using a high energy particle beam, nuclear fuel elements and a liquid metal target material. For example, a proton accelerator produces high energy protons that interact with a liquid lead-bismuth metal that surrounds LWR fuel elements placed in pressure tubes whereby the interaction of the beam and liquid metal produces neutrons. The neutrons are absorbed by the nuclides in the fuel elements and transformed to fissle material.

U.S. Pat. No. 3,349,001, entitled "Molten Metal Proton Target Assembly," to Stanton, issued Oct. 24, 1967. This patent discloses a thermal nuclear apparatus having a molten metal high nergy proton target, e.g., molten lead, surrounded by a blanket of fertile material and a recirculating coolant.

To date, none of the accelerator-driven systems have received the funding necessary to construct and operate a system demonstrating enhanced waste burning capabilities. One reason seems to be that the addition of an expensive accelerator and extensive chemical separations increase the cost of these transmutation concepts well beyond that of conventional reactor technology which is itself too expensive for deployment for waste burning. Since geologic storage adds only incrementally to nuclear electric power costs, transmutation should also add only incrementally to the cost. Therefore, if an accelerator must be added, other components or operations normally required for nuclear power should be eliminated to keep costs under control.

SUMMARY OF THE INVENTION
(DISCLOSURE OF THE INVENTION)

A subcritical reactor-like apparatus for treating actinide wastes, the apparatus comprising a vessel having a shell and an internal volume. In the preferred embodiment, the shell comprises a metal, for example, HASTELLOY®, a federal trademark owned by Haynes International, Inc. (Kokomo, Ind.), while the apparatus typically has means for removing volatile material from the vessel. The internal volume of the vessel houses graphite, preferably a solid graphite matrix. The graphite matrix in certain embodiments comprises greater than 80% of the internal volume of the vessel. The apparatus preferably also has a fluid medium comprising molten salts and plutonium and minor actinide waste and/or fission products. The molten salts are typically fluoride salts and/or chloride salts. When fluoride salts are used, NaF and/or $ZrF_4$ are suitable. The apparatus also introduces the fluid medium into the internal volume continuously and/or periodically. The apparatus introduces neutrons into the internal volume wherein absorption of the neutrons after thermalization forms a processed fluid medium through fission chain events averaging approximately 10 fission events to approximately 100 fission events. This is preferably accomplished using at least one high energy particle beam and at least one target material, where the target material is preferably lead and/or bismuth. The apparatus of the present invention also removes the processed fluid medium from the internal volume continuously and/or periodically. In addition, the processed medium typically comprises less than approximately 0.1 mole fraction percent of $^{242m}$am and/or an isotopic composition of plutonium of less than that necessary for production of nuclear weapons. Fluid medium introduction and removal processes transfer fluid medium and processed fluid medium at rates sufficient to maintain an isotopic equilibrium and constant average fission chain length within the vessel wherein the fission event chains average approximately fission events to approximately 100 fission events and preferably from approximately 20 fission events to approximately 40 fission events.

In a preferred embodiment of the present invention, the apparatus additionally separates zirconium cladding and uranium from actinide wastes. In another preferred embodiment, the apparatus additionally recovers energy released by fission events, such as by at least one heat exchanger contained within the internal volume of the vessel, the heat exchanger(s) preferably have metal heat exchange surface for heat transfer and fission product deposition. In yet another preferred embodiment, the recovered energy provides energy for introducing neutrons.

The present invention also comprises a method of treating nuclear material comprising: providing a fluid medium comprising molten salts and at least one member selected from the group consisting of plutonium and minor actinide waste and fission products; introducing the fluid medium into a vessel, the vessel containing graphite; introducing neutrons into the vessel wherein absorption of the thermalized neutrons forms a processed fluid medium through fission chain events averaging from approximately 10 fission events to approximately 100 fission events and preferably averaging from approximately 20 fission events to approximately 40 fission events; and removing the processed medium from said vessel.

The method of present invention also includes a method of introducing processed fluid medium into the vessel in place of unprocessed fluid medium. In this particular method of introducing, the processed fluid medium from one apparatus of the present invention is useable as a start-up fluid medium for another apparatus of the present invention. Therefore, start-up is facilitated after the first such apparatus becomes operational. Likewise, all apparatuses of the present invention produce processed fluid media suitable for start-up of additional apparatuses. Operation in such a manner contributes to the efficiency of the present invention.

A primary object of the present invention is to transmutate nuclear waste. Other objectives include, but are not limited to:

Destruction of essentially all of the weapons-useful material in commercial reactor spent fuel;

Recovery of nearly all of the fission energy of the plutonium and other fissioning nuclides;

Elimination of the possibility of waste recriticality in permanent storage;

Reduction of the long-term waste radioactivity;

Decoupling of nuclear power production from an associated large weapon-useful waste inventory; and Recovery of full costs by the generation and sale of electric power.

A primary advantage of the present invention is a synergy derived through recovery of fission energy whereby operation costs are minimized. This advantage and other advantages are derived in part from the following features:

Replacement of reprocessing with more modest front-end chemistry;

Elimination of separation of a pure stream of plutonium;

Elimination of back-end chemistry;

Elimination of fuel fabrication and refabrication; and

Elimination of the need for fast spectrum reactors for fuel destruction.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS (BEST MODES FOR CARRYING OUT THE INVENTION)

The present invention results from a novel combination of particle accelerator, reactor, and chemical separations technology which enables transmutation of spent commercial reactor nuclear fuel in a more simple, less costly, and more effective means than by implementation of existing reactor technology or other subcritical transmutation concepts.

The present invention acts to nullify the weapons-usefulness of the commercial plutonium in the waste, reduce the long-term radioactivity of the waste, recover the nuclear energy in the waste and sell such energy into the commercial grid, and eliminate the possibility of recriticality of the remnant waste in permanent storage. These functions are accomplished without producing a pure stream of weapons-useful plutonium or implementation of fuel fabrication, reprocessing, fuel refabrication, or the technology of fast breeder reactors. The value of the power sold is expected to be sufficient to pay both capital and operations costs for waste destruction.

The invention consists of a subcritical reactor-like process moderated by graphite through which flows a molten salt medium carrying plutonium and minor actinides ("PMA") and fission products in solution. Liquid fuel is continually fed into the subcritical system vessel and continually removed so that the total volume of liquid is approximately constant. The continuous insertion of fresh fissile fuel from the LWR waste and the continuous removal of fission product by removal of the carrier establishes an equilibrium subcritical reactivity which may be maintained indefinitely. The subcriticality is associated with fission chains of finite length as opposed to nearly infinitely long chain reaction as in an ordinary reactor. Subcriticality is maintained such that the average fission chain contains from approximately 10 to approximately 100 fission events and preferably from approximately 20 to approximately 40 fission events.

The fission chains are started by a particle beam with sufficient energy to produce many neutrons per particle when the particle expends its energy by striking a liquid target within the vessel that contains lead or bismuth or both. The combination of particle beam current, beam energy, and average fission events per chain is sufficient to produce a fission power in the range of hundreds of megawatts. The fission heat is recovered from the molten salt by a heat exchanger internal to the vessel that allows for the removal of the heat and the generation of electric power in, for example, a steam cycle. The power consumed by the accelerator in accelerating this beam is small (about 10%) compared to the electric power generated.

The large heat transfer metallic surface inside the heat exchanger serves, in addition to heat transfer, as a deposition site for several of the metallic fission products. The deposition of these fission products outside of the region of high neutron flux limits the loss of neutrons by non-useful absorption and makes more neutrons available for PMA transmutation. The heat exchangers are designed to be readily replaceable providing additional means for fission product removal besides being carried away in the removed molten salt. Some of the fission products are noble gases or form volatile fluoride species that are not confined by the carrier salt. These fission products are removed by the flow of helium gas, or similar inert gas, across a free turbulent surface of the molten salt.

The isotopic composition of the feed PMA chemical elements is transmuted to a new isotopic composition by thermal neutron absorption. Not all neutron absorption events on isotopes which may be caused to fission by thermal neutrons result in fission events. Those that result in fission deplete the number of fissile nuclides; those that do not cause fission also decrease the number of fissile nuclides by transforming them to non-fissile species. The residence time of the PMA in the system in equilibrium is long enough for several neutron absorption events on the same nuclide. Therefore the equilibrium composition is significantly depleted in fissile species compared to the feed and is incapable of supporting a self-sustained continuous chain reaction and is not practical for use in nuclear weapons.

The incoming fluid medium feed stream, which contains weapons-useful plutonium, is nearly immediately mixed with the equilibrium mixture in the transmuter and is therefore nearly immediately transformed into non-weapons useful material. Therefore, in contrast to other waste destruction schemes, weapons-useful material can never be recovered after feed into the transmuter.

The feed for the transmuter is prepared by removal of the zirconium fuel cladding metal and separation of the uranium from the PMA and fission product by fluorination. The PMA and fission product may be fed into the transmuter together or the PMA may be further separated from the fission product and PMA only fed into the transmuter. In either case, a pure stream of weapons plutonium is never produced or stored. No separations chemistry or recycle is required for the process fluid medium exit stream.

The effectiveness of transmutation depends to a large degree on the number of neutrons available for absorption into those species to be destroyed or transmuted. Neutrons absorbed into stable fission products provide no benefit and this process becomes a significant means for loss of neutrons. This means for neutron loss is reduced by the transmutation of the most absorptive fission product by thermal neutron capture to non-absorptive fission product. For the most troublesome nuclides this transmutation in a thermal spectrum occurs in a time much shorter than the residence time of the fission product in the transmuter. Therefore the neutron absorption probability of the fission product is decreased by the ratio of the transmutation time to the residence time.

The nuclide $^{242m}$Am, which has the largest fission cross section of any nuclide by far, might have nuclear weapons potential. It is produced in significant quantities in waste destruction systems based on a fast neutron spectrum, whether in reactors or accelerator-driven systems. Because of its very large thermal fission cross section, it is destroyed immediately after it is produced in the thermal spectrum so that useful amounts cannot be recovered from the exit stream.

The benefits from the practice of this invention derive from the successful implementation and combination of a thermal neutron spectrum, liquid fuel, the continuous feed and removal of liquid fuel, and the accelerator, which makes possible safe operation with liquid fuel and allows enhancement of useful neutrons.

The benefits are made available with reduced front-end processing, and without back-end separations, recycle, fuel fabrication or fuel refabrication, or the implementation of technology from breeder reactor development.

The present invention incorporates an accelerator and other design features in such a way as to offset and eliminate several components and operations of high cost approaches to treatment of nuclear wastes; the present invention also allows for the use of less expensive structural materials. Furthermore, electric power generated by the present invention is saleable into the commercial grid at a price equal near that of conventional power plant LWRs thereby generating revenue to pay the present invention's capital and operational costs for transmutation. Thus, in a preferred operational mode of the present invention, the cost of transmutation is near zero.

The present invention is not designed to destroy all of the radioactive constituents of the waste, so geologic storage of the remnant waste from the present invention is still necessary. However, present invention accomplishes the following: destroys essentially all of the weapons-useful material in commercial reactor spent fuel; recovers nearly all fission energy of plutonium and other fissioning nuclides; reduces long-term waste radioactivity; decouples nuclear power production from an associated large weapon-useful waste inventory; and recovers full costs by generation and sale of electric power.

Part of the reason that the low capital and operating costs are possible compared to other transmutation technologies is that the present invention achieves its objectives while: replacing reprocessing with more modest front-end chemistry; eliminating separation of a pure stream of plutonium; eliminating back-end chemistry; eliminating fuel fabrication and refabrication; and reducing accelerator size by a factor of about two when compared to other transmutation concepts.

The present invention's transmutation process also ameliorates problems of geologic storage. The sufficiency by which it allows geologic storage to proceed for the transmuted waste remnant in all likelihood will differ from one nation to another depending on many factors. However with a transmutation program eliminating the concerns for weapons-useful nuclear material, one nation need have no concern about how other nations dispose of transmutation remnant, in sharp contrast to the current status amongst nations. Therefore, deployment of the present invention will transform the character of the geologic storage debate while also producing other benefits. If radioactivity of the remnant remains a concern, the radioactivity can be reduced by an additional factor of 200 by extensions of the present invention's technology. Although the cost of this further reduction is not zero, the incremental cost is small because the extended technology is applied to only the remnant rather than the full amount of the waste.

To achieve the foregoing objectives while keeping the cost sufficiently low for widespread deployment as mentioned above, one embodiment of the present invention for transmuting waste from commercial nuclear power plants includes a liquid heavy metal target that is struck by a proton beam of high current and intensity for the purpose of producing neutrons. These neutrons originate near the center of a tank having a volume defined by several meters in diameter and several meters in height. These neutrons, generated with energies in the million electron volts range, undergo scattering in graphite that fills most of the tank volume. The scattering reduces the neutron energies into or near to the thermal range that is the energy of about 0.07 electron volts corresponding approximately to the operating temperature of the graphite. Holes in the graphite filling the volume of the tank serve as flow paths for a liquid carrier salt mixture such as $NaF$—$ZrF_4$. The waste actinides including primarily Pu, Np, Am and Cm and fission products to be transmuted, after being separated from the commercial reactor spent fuel, are converted to fluoride salts and dissolved into the liquid carrier salt.

The neutrons produced by the accelerator interact with the waste by neutron capture in the fission products and by absorption in the actinides leading to fission or capture. Each fission releases several neutrons on average which slow down by scattering in the graphite. The concentration of the waste and other constituents and the geometry of the system is adjusted so that a continuous chain reaction is almost but actually not possible. Therefore, a continuous chain reaction such as that in a conventional reactor is impossible; however a self-terminating chain reaction having an average chain length in the neighborhood of approximately 10 to approximately 100, or more preferably approximately 20 to approximately 40, fission events in length is possible. Each neutron produced by the accelerator has the opportunity to start such a fission chain. The number of neutrons produced per second by the accelerator beam is large enough that the fission rate in the system, and therefore the fission power, is in the range of several hundreds of megawatts.

In general, the present invention's destruction of actinide atoms by fission creates fission products that almost always are two in number for each atom destroyed. In a preferred embodiment of the present invention, actinide atoms are added to the system as fast as they are destroyed by fission by adding fresh actinide waste to the liquid fuel. Also fission products are removed from the fuel as fast as they are created by fission by draining away the salt which carries the actinide and the fission products. Therefore, an equilibrium is established with carrier salt being added and removed at the same volume rate, with actinide being added as fast as it is burned away, and with fission products being removed as fast as they are produced in the system. In this equilibrium condition the carrier salt level in the system remains relatively constant and the fission product and actinide concentrations remain relatively constant. The average chain length is therefore controllable, e.g., it can be maintained relatively constant at approximately 20–40 fission events or as otherwise desired. The residence time in the tank of the carrier salt and the other salts dissolved in the reactor vessel is several years during which time about 80% of the actinide atoms are caused to fission.

An essential feature which enables high performance is fission product burn-out. In the thermal neutron flux of this system, high cross section fission products are transmuted to low cross section nuclides in a time much less than the residence time of the fission product nuclides in the system. The result is that the average capture cross section of the fission products is much smaller than in other transmutation systems. Non-beneficial capture of neutrons in fission products is reduced with corresponding significant enhancement in system waste burn-up performance.

In a preferred embodiment of the present invention, the carrier salt is heated by the energy released in the fission process. The internal flow of the salt is therefore through the graphite, then to internal heat exchangers, and then back through the graphite. The salt therefore never leaves the tank in normal operation. The carrier salt, which may also be called the primary salt, is cooled in the heat exchangers inside the tank by heat transfer to a second salt with lower melting point which flows in an external loop referred to as the secondary loop. This loop contains a steam generator which cools the secondary salt by converting the heat to steam which is used to drive a steam turbine for electric power generation. The electric power generated is more than sufficient to power the accelerator which provides the proton beam used to produce the neutrons which start the fission chains. About 90% of the electric power generated is saleable into a commercial grid at a price which is likely to pay all of the capital and operations cost of the system. If all of these costs actually are paid by electric power sales, the cost of destruction of the waste is zero.

The benefits of the present invention include the destruction of the nuclear weapons useful material in commercial spent fuel, the conversion of remnant actinide waste to a form highly unfavorable for nuclear weapons use, the conversion of the remnant waste to a form for which criticality is virtually impossible in permanent geologic storage or in any operations preceding geologic storage, and the extraction of about 80% of the fission energy potentially recoverable from the commercial spent fuel. In addition longer-lived fission product species such as $^{129}$I and $^{99}$Tc are reduced.

The advantages of this method compared to other proposals is that it requires no back-end chemistry, no solid fuel fabrication, no solid fuel refabrication, no fuel cooling time prior to chemistry and no system down time for refueling. There also are no transportation requirements among the facilities required for the foregoing functions. In addition, because the fission chain length is maintainable steady with time, the accelerator required is smaller, and therefore the capital cost, operating cost, and electric power usage are smaller than that for competing systems.

Virtually all of the world's nuclear power is produced from conventional light water reactors (LWRs) which produce in addition to nuclear power waste containing weapons-useful plutonium, americium and neptunium. Each of the approximately 400 LWRs in the world produces about 250 kg per year of plutonium and neptunium. By the end of an assumed lifetime of 40 years, these reactors will produce more than 4,000,000 kilograms of plutonium. Some nations wish to view this material as an asset and accordingly have devised mixed oxide (MOX) fuel fabrication for burning this material in light water reactors. However, this approach does not allow the burning of nearly all of the plutonium and, as seen in the upper part of FIG. 1, it requires a complex infrastructure. In the scenario presented in the upper part of FIG. 1, separation of a pure stream of plutonium in a reprocessing step occurs first. Subsequent to this required reprocessing step, solid MOX fuel assemblies are manufactured out of this highly radioactive material, which is considerably more difficult compared with the manufacture of ordinary LWR fuel assemblies because of the radioactivity. Such technology allows two cycles of MOX burning before going through the reprocessing step to produce pure plutonium for burning in fast reactors. In principle it can all be burned away in fast reactors with repeated recycle. Alternatively, bypass of MOX burning in the LWRs is possible followed by fast reactor burning. However, a fast reactor is considerably more expensive to build and operate than an LWR, thus significant burning of plutonium has only been done in LWRs, which is an incomplete process. In any case, geologic storage of the remnant waste is required.

Other nations such as the U. S. and Sweden fear that the pure plutonium stream produced in reprocessing represents a high proliferation risk and, therefore, plan to bury the spent fuel directly into geologic storage facilities. This approach has an additional benefit that the total cost of nuclear power is reduced by avoiding the reprocessing and the subsequent plutonium burning steps. However, this approach also results in the accumulation of enormous amounts of weapons-useful material in repository storage as stated above. While it is no threat as long as it stays in storage, the International Atomic Energy Agency has argued that such waste must be guarded in perpetuity which probably is not practical. There is potentially great benefit from recovering plutonium from geologic storage for weapons use. It has been shown that a nation or subnational group wishing to develop nuclear weapons sometime in the future will find it ten times faster and ten times less expensive to recover plutonium from geologic storage than to develop reactors to produce plutonium or to produce highly enriched uranium by isotopic separation. Many would therefore argue that the U. S. policy of direct storage of spent fuel must change to one allowing burning sufficient to at least eliminate the weapons-useful material and thus make possible geologic storage safe at least from the proliferation perspective. Interest is rising world-wide in the use of fast reactors and accelerator-driven systems for the purpose of waste burning. Fast reactors alone appear not to be practical because of the high cost already mentioned and because, according to the U. S. National Academy of Sciences, the reduction of plutonium would require an impracticably long campaign. Accelerator-driven fast reactors are also under study, but an argument can be made that if fast reactors and associated facilities are already too expensive, how can one make these systems practical with the addition of an expensive accelerator? Proponents believe that the accelerator will reduce the cost of some of the facilities and thereby make the costs acceptable. The intent behind the present invention is to make plutonium burning practical by using an accelerator with a thermal spectrum system to eliminate associated elements completely as illustrated in the bottom part of FIG. 1.

Figure 1:
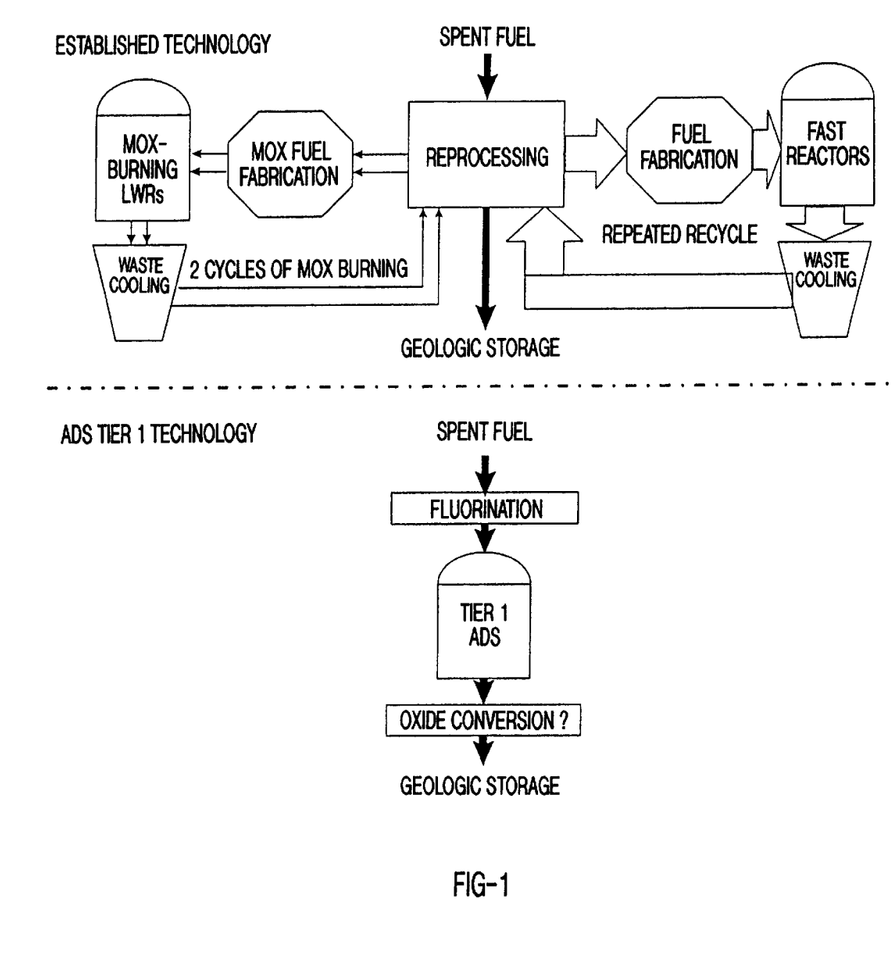
FIG. 1 is a figure that shows in the upper part, the complexity of the technology required for waste destruction using conventional technology compared with the more simple system described in this patent and shown in the lower part of the figure.

An embodiment of the present invention, as shown in the lower part of FIG. 1, uses a fluorination step for removal of zirconium and uranium which are the main constituents of the spent fuel. The actinides alone or the actinides plus the fission products are then fed into the thermal spectrum liquid fueled system labeled as Tier-1 accelerator driven system (ADS) in FIG. 1. Without any further steps and with only a single pass, the weapons-useful material is eliminated. The 20% of the non-weapons-useful actinide which remains from actinide-only burning is recycled to a system similar to embodiments of the present invention. In such a system nearly complete burn-up is possible of the actinide and long-lived fission product thereby eliminating most of the need for geologic storage. Alternatively, the 20% non-weapons remnant is converted to oxide and sent to geologic storage. Both the ADS technology and "established technology" of FIG. 1 eliminate weapons-useful material and require geologic storage of the remnant, so their functional performance reaches basically the same end result. However, the evident elimination of many functions by comparison of the top and bottom of FIG. 1 is the reason that the thermal spectrum system incorporating an accelerator is practical from a cost perspective in spite of the inclusion of an accelerator. The accelerator allows the elimination of several costly facilities and operations.

Figure 2:
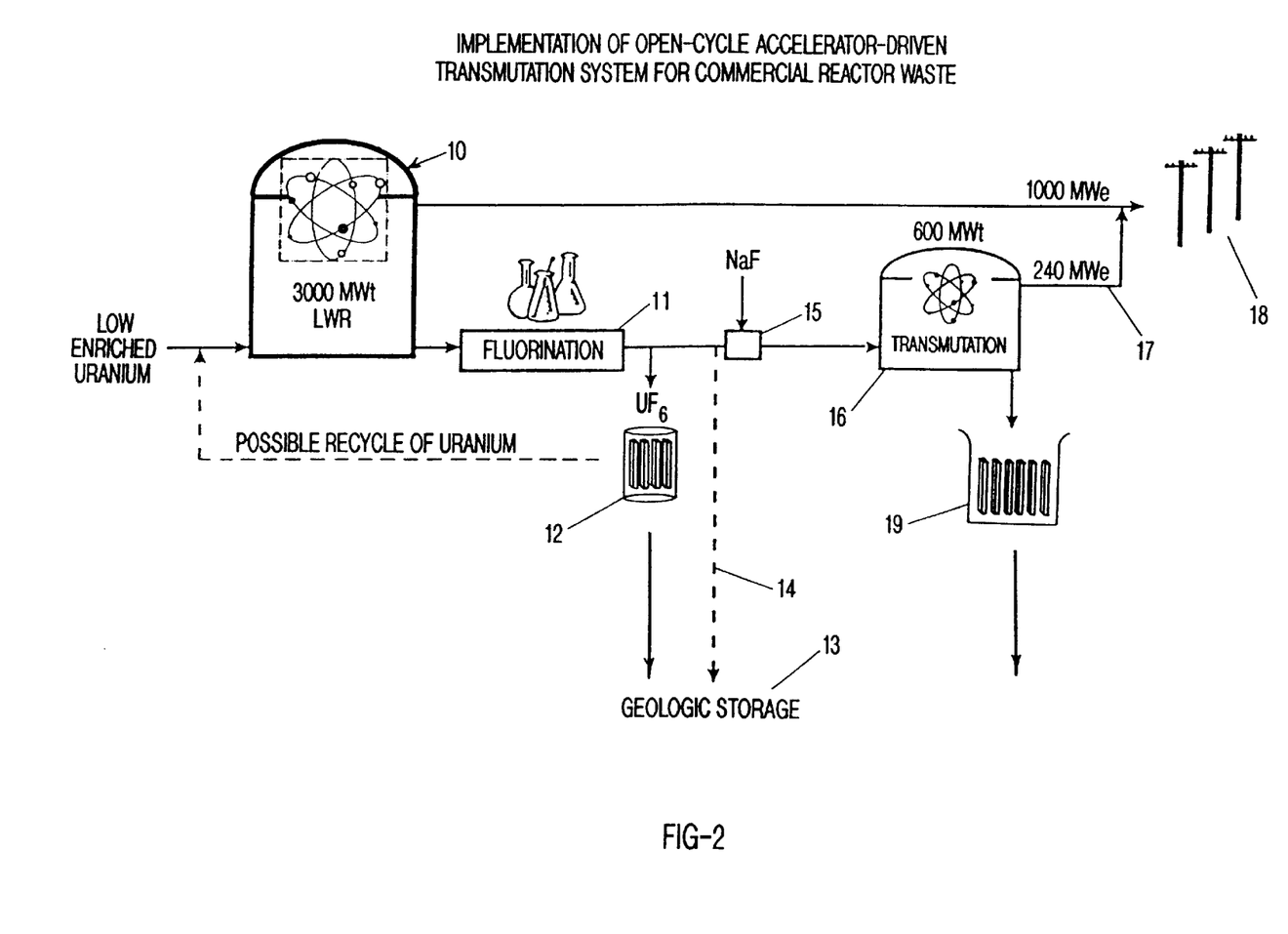
FIG. 2 is a schematic representation of the various elements and functions which together enable the waste destruction described in this invention.

FIG. 2 shows the various elements and functions of the apparatus. A conventional LWR 10 generates 1000 megawatts of electric power for distribution into the commercial grid and about 3000 megawatts of fission heat. In FIG. 2, a transmuter 16 is fed with approximately 300 kg per year of plutonium and minor actinide and outputs approximately 65 kg per year of plutonium and minor actinide and approximately 235 kg per year of fission product along with $NaF-ZrF_4$ carrier salt. As shown in FIG. 2, approximately 240 MW of electric power is available for input to a commercial grid; sale of this power pays for most of the transmutation capital and operating cost. The transmuter 16 is practically placed either at the power plant site or at a central transmutation site. Overall, the system shown in FIG. 2 destroys weapons plutonium or other weapons material, eliminates the possibility of underground criticality in a repository, recovers 80% of fission energy before waste emplacement, and eliminates instantly and irreversibly the weapons potential of plutonium upon entry into the transmuter 16. The spent fuel assemblies which are removed from the reactor undergo a fluorination process 11 based on established non-aqueous chemistry which converts the constituents, except for noble gases, to fluoride chemical compounds. The fuel assemblies are dad with zirconium which is converted to $ZrF_4$ salt. The uranium inside the fuel assemblies is converted to $UF_6$ and stored in canisters 12 for possible reuse. Alternatively, the canisters are sent to geologic storage 13. The reactor produces 300 kg/year of higher actinide which consists mostly of plutonium and about 15% minor actinide. The reactor also produces 1200 kg/year of fission products. Both the higher actinides and fission products are sent to the transmuter 16, or, alternatively, only the higher actinides are sent. If the fission products are not sent to the transmuter, they are sent 14 to geologic storage. If fission products are not sent to the transmuter, the fluorination step 11 is supplemented by additional non-aqueous separations operations to remove the fission products.

Some of the ZrF4 is sent to the transmuter along with the higher actinides and fission products. Before entering the transmuter, NaF or a material of similar neutronic, chemical, and physical character is added 15 to the actinide and fission product mixture in about equal amounts in molecules to the $ZrF_4$. The NaF and $ZrF_4$ make up about 90% of the total of the fluoride molecules being added into the transmuter. Together they form a molten salt with a melting point of about 550 degrees Celsius and this molten salt mixture becomes a carrier for the higher actinide and fission product fluorides which are dissolved into the carrier. If the transmuter processes waste as fast as it is produced in the LWR, a feed of 300 kg/year of plutonium and minor actinide (PMA) is required by the system. If all of the fission product produced in the LWR per year is fed into the system as fast as it is produced, about 1200 kg/year flows into the system.

The transmuter 16 is a nuclear-reactor-like facility which however is subcritical and incapable of supporting a continuous chain reaction. However, fission chains of finite length of about 10 to 100, and preferably 20 to 40, fissions in the actinide material are started by neutrons produced by a beam of protons. In a preferred embodiment of the present invention, this beam enters the transmuter in a vertical or near vertical direction and strikes a liquid target that may consist of a heavy metal such as lead or a lead-bismuth mixture. For a beam energy of 1 GeV, one proton produces about thirty neutrons in expending its energy in the lead and about half of these neutrons start fission chains. Heat from the fission process Is converted to electric power 17 by steam-driven turbines and most of this electric power is saleable into the commercial grid 18. Roughly 10% of the electric power is used by the accelerator and therefore not sold into the grid.

The fraction of the 300 kg/year of PMA fed into the transmuter which is destroyed depends on the amount of fission product from the commercial LWR which is fed into the transmuter. Any portion between almost all or almost none of the LWR fission product is sent into the system. If almost none is sent in, about 80% of the PMA is destroyed by fission and about 600 megawatts of fission thermal power is produced. In that case the amount of actinide fissioned is about 240 kg/year and the amount of fission product generated by this fission and removed from the transmuter is the same amount or about 250 kg/year.

If almost all of the fission product from the LWR is sent in, the fraction of the PMA fissioned is less and is about 66%. Therefore about 200 kg/year of PMA is fissioned and the same amount of fission product or about 200 kg/year are created internally. The fission thermal power produced is also less and is about 500 megawatts. The fission product removed from the system is all of that sent in which is 1200 kg/year plus 200 kg/year generated in transmutation for a total of 1400 kg/year. The salt removed from the system containing the transmuted PMA and fission products is placed in steel canisters 19 for cooling and possible further transmutation for complete destruction of PMA and long-lived fission products. Alternatively, the removed salt is convertible from fluoride to oxide and sent to geologic storage after an appropriate cool-down period.

Figure 3:
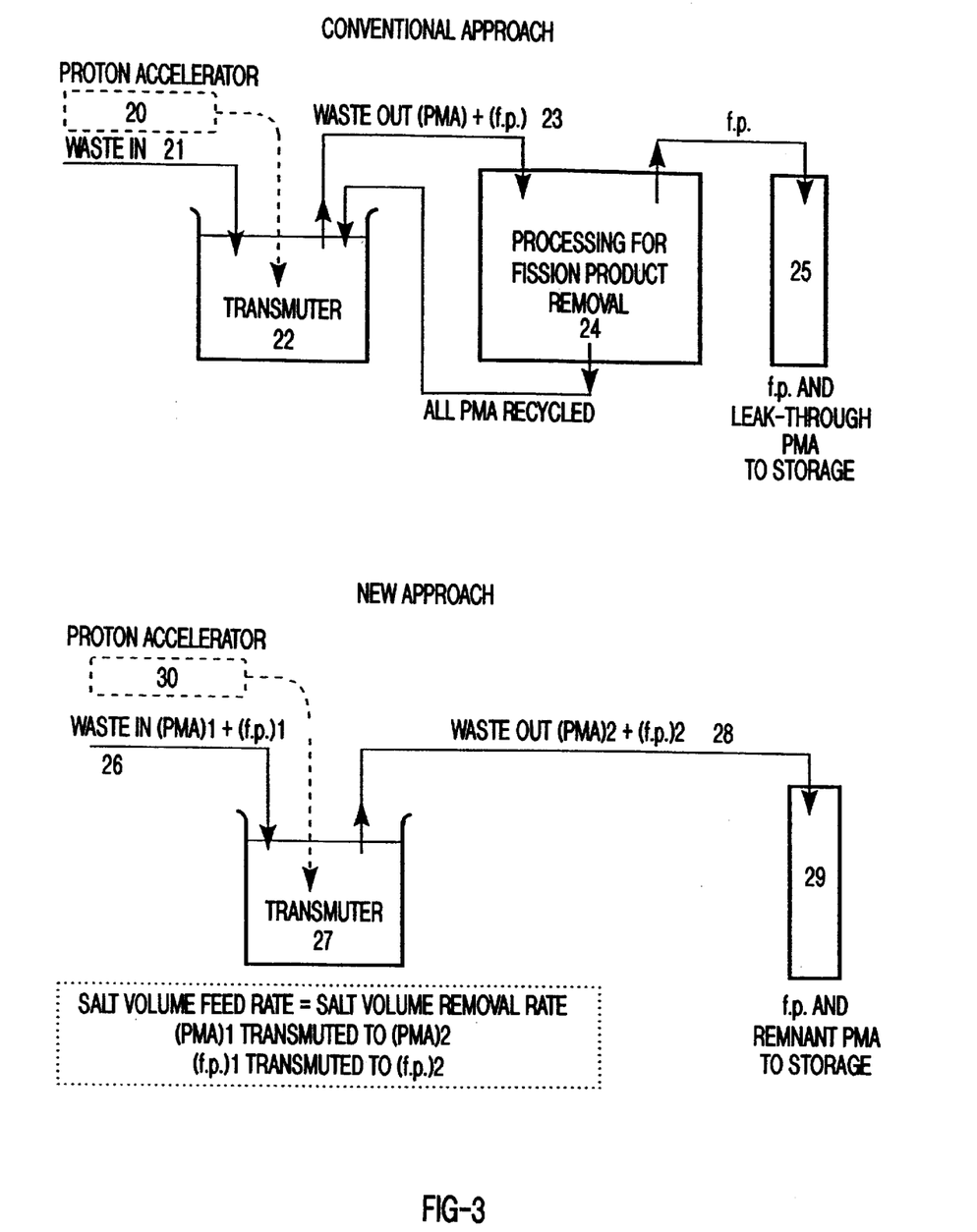
FIG. 3 is a schematic that contrasts the once-through flow of liquid fuel through the present invention, lower portion of schematic, with the recycled flow of solid fuel through conventional waste burning concepts, upper portion of schematic.

FIG. 3 is a schematic representation showing the essential difference between recycle for fission product removal as commonly proposed in transmutation and a continuous flow embodiment of the present invention. The conventional approach to transmutation as shown in the upper part of FIG. 3, typically includes an accelerator 20, usually incorporates solid fuel, and involves closely coupled back-end chemistry. Waste is fed 21 Into the transmuter 22 by appropriate means and removed 23 after partial burning for the purpose of fission product removal 24. The removal process requires a high degree of efficiency In returning nearly all of the PMA to the transmuter for further transmutation. Returning some of the fission product, as well as PMA, is acceptable but less desirable. The extracted fission product typically goes to storage 25 with as little PMA mixed with the stored fission product as practical. One problem with this conventional approach is the cost, expense, and time required for the back-end fission product removal. At a minimum the chemistry operation is substantial, but there is also possibly the need for fuel destruction, fuel refabrication, fuel cooling and down time for fuel removal and insertion.

The lower section of FIG. 3 illustrates the comparative simplicity of a continuous flow embodiment of the present invention which incorporates an accelerator 30. LWR waste is fed 26 into the transmuter 27 in the form of molten fluoride salt. The transmuter is considered a tank, or vessel, in which the waste entering as $(PMA)_1$ and $(f. p.)_1$ dissolved in $NaF-ZrF_4$ is transmuted to other forms by neutron-induced reactions. After the system has reached equilibrium, molten salt consisting of the carrier $NaF-ZrF_4$, the $(PMA)_2$ and $(f. p.)_2$ is removed 28 from the tank at the same rate that salt is fed into the tank. This removed salt is not returned to the tank but is stored in appropriate canisters 29. Therefore back-end chemistry as well as possible fuel destruction, fuel cooling, and fuel refabrication are eliminated. Capital and operating costs are reduced and the cost of down-time spent in removing and adding fuel also is eliminated.

The removed salt has a different composition from the fed salt. Although the carrier salt is unchanged, the input (PMA), concentration is reduced by the fission process and the isotopic composition transformed to the output $(PMA)_2$. The input $(f. p.)_1$ concentration in the carrier salt is increased by the fission products produced by fission in the transmuter to the output $(f. P.)_2$ concentration. Note the seemingly trivial point that the removed salt has the same composition as the salt in the tank. This point is important because it means that the isotopic composition of the fed salt is changed immediately and irreversibly upon mixing with the salt in the tank. This is a valuable feature from the perspective on non-proliferation of nuclear weapons. For most transmutation concepts, the inventory of weapons-useful material is quite large and feeding it into a transmuter for destruction does not prevent its being removed before destruction is complete. This embodiment of the present invention, by contrast, has the feature that once the weapons-useful material is fed in, it immediately is rendered no longer useful for nuclear weapons use.

Figure 4:
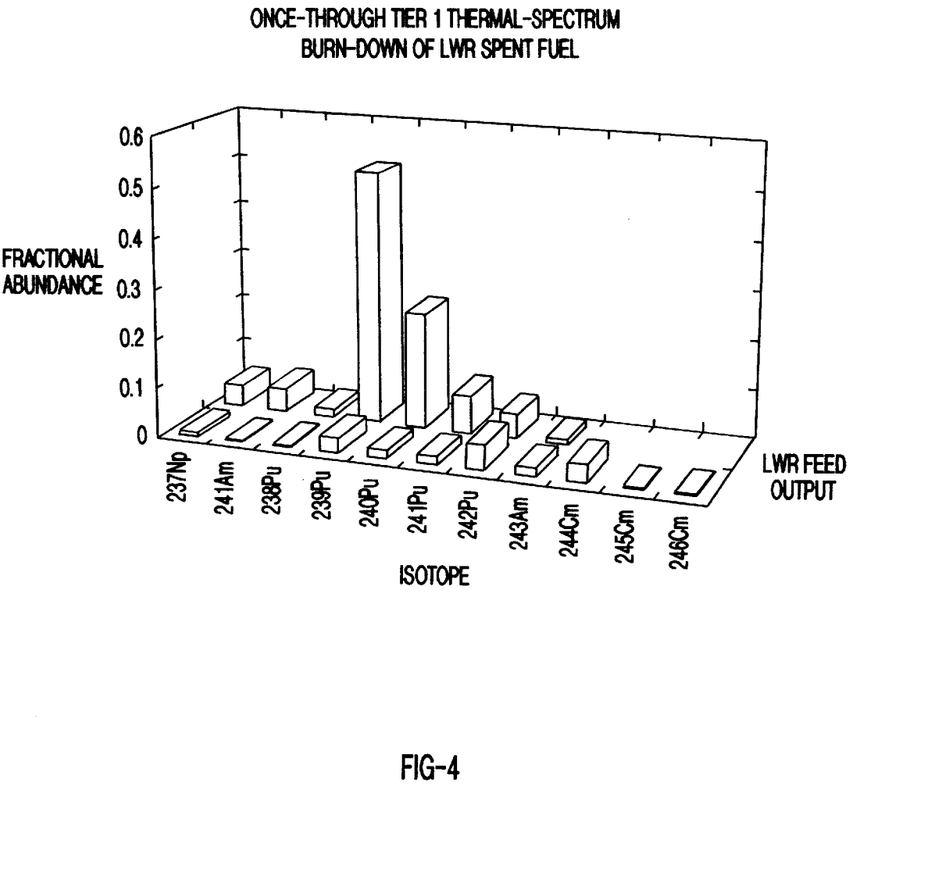
FIG. 4 is an illustration of the performance of the present invention showing the amount and isotopic composition of the actinide feed material as well as the amount and isotopic composition of the output remnant.

The degree of the change between the input and internal composition of the actinide is illustrated in FIG. 4 where the input and output (or internal) isotopic compositions of the actinides are compared for the case of no feed of LWR fission products. The back bars show the isotopic abundance of the spent fuel plutonium and minor actinide which is the feed for the transmuter. The front bars show the major reduction in total actinide and the isotopic composition in the exit stream. Only about 20% of the LWR actinide feed remains in the exit stream, so nearly all of the fission energy from the plutonium and minor actinide is recovered. Clearly the exit isotopic composition is no longer dominated by the fissile species $^{239}$Pu and $^{241}$Pu and the weapons value and criticality potential are greatly reduced. If this material is sent to geologic storage, the actinide load is reduced overall by a factor of almost five, the plutonium content is reduced by seven, and the neptunium is reduced by ten. The Np reduction is significant because it is the most mobile of the actinides in a geologic repository and because it is the only isotopically pure weapons-useful material in LWR spent fuel. Data presented in FIG. 4 as a fractional abundance versus isotope for feed and output after a single pass through the system are as follow:

| Isotope | Feed | Output |
| --- | --- | --- |
| $^{237}$Np | 0.045 | 0.0093 |
| $^{241}$Am | 0.051 | 0.0040 |
| $^{238}$Pu | 0.014 | 0.0052 |
| $^{239}$Pu | 0.515 | 0.0325 |
| $^{240}$Pu | 0.238 | 0.0197 |
| $^{241}$Pu | 0.079 | 0.0186 |
| $^{242}$Pu | 0.048 | 0.0536 |
| $^{243}$Am | 0.009 | 0.0223 |
| $^{244}$Cm | 0.000 | 0.0414 |
| $^{245}$Cm | 0.000 | 0.0012 |
| $^{246}$Cm | 0.000 | 0.0043 |
| Total | 1.000 | 0.2121 |

A key feature of the present invention that makes possible this degree of transmutation without back-end reprocessing is the reduction in the fission product effective capture cross section for neutrons (the term cross section is the apparent area of the atomic nucleus which would intercept neutrons flying in random directions through the medium and it is measured in a unit of area of $10^{-24}$ cm$^2$ called the barn). The average cross section for the fission product material arising from the fission process might be about 30 barns if one averaged over all of the capture cross sections weighting them with the fission product abundances. However a few of the fission products have cross sections much larger than thirty barns. Naturally these fission products are more rapidly transmuted than those with smaller cross sections and in almost every case the capture cross section of the daughter fission product after neutron absorption is much lower than that of the parent. If the nuclides with the larger capture cross sections are transmuted to a nuclide with a smaller cross section in a time short compared to the average residence time of the fission product in the tank, the fission product with large cross sections are not present most of the time. For the embodiment of the present invention described here, the average fission product capture cross section undergoing irradiation in the tank 27 is found to be 6.00 barns instead of 30 barns.

This reduced effective fission product capture cross section is of great importance to the degree of burn-up possible for PMA. Loss of neutrons by capture on fission products does not allow them to be used to destroy as much PMA. An important feature of the thermal spectrum as implemented in this invention is that the rate of burn-up of PMA or f. p. is fast enough to make practical this reduction in effective fission product cross section.

The Target-Blanket

Figure 5:
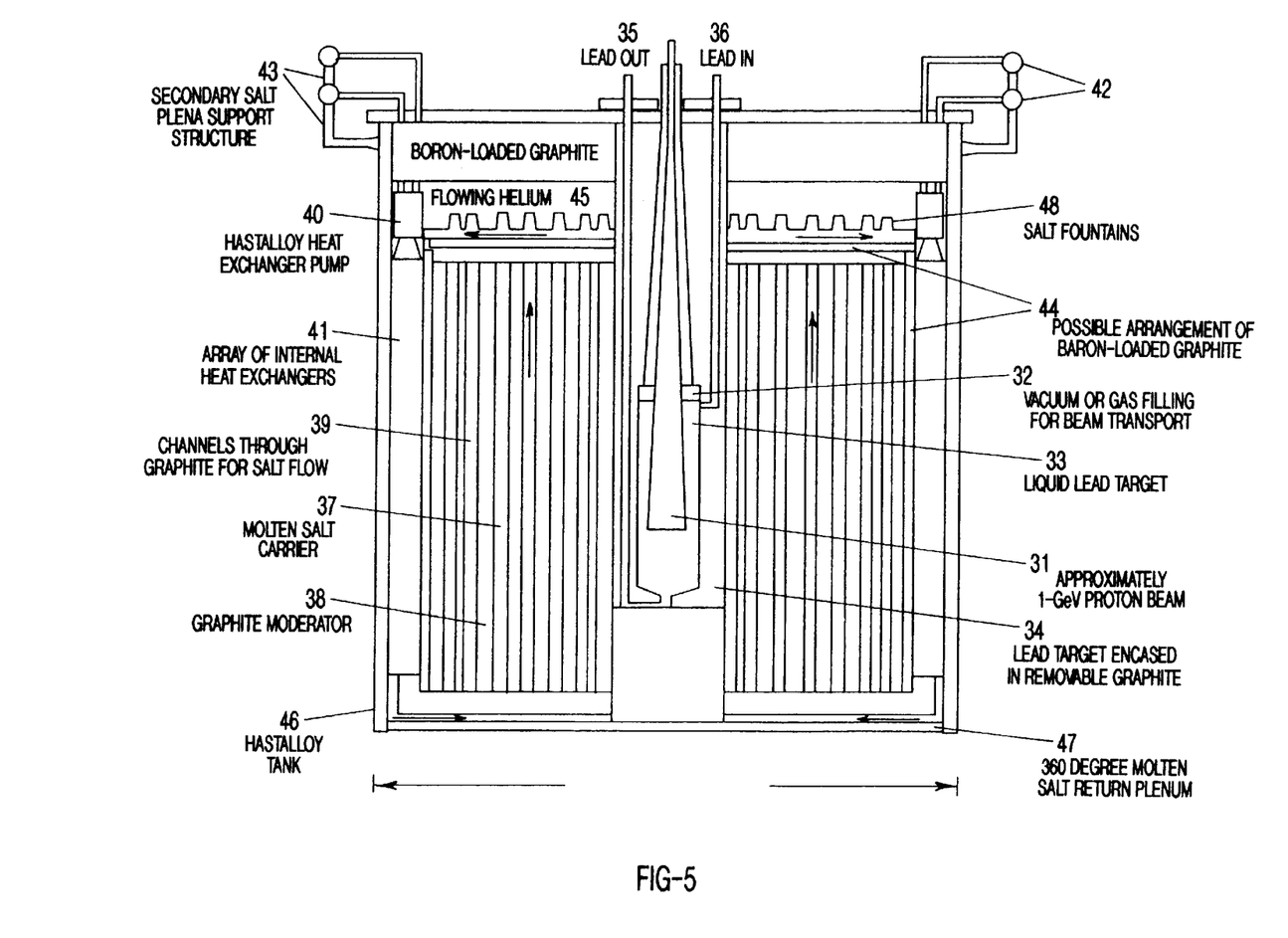
FIG. 5 is a schematic representation of the tank where the waste destruction occurs and an illustration of the integration of the essential features of the design.
Figure 6:
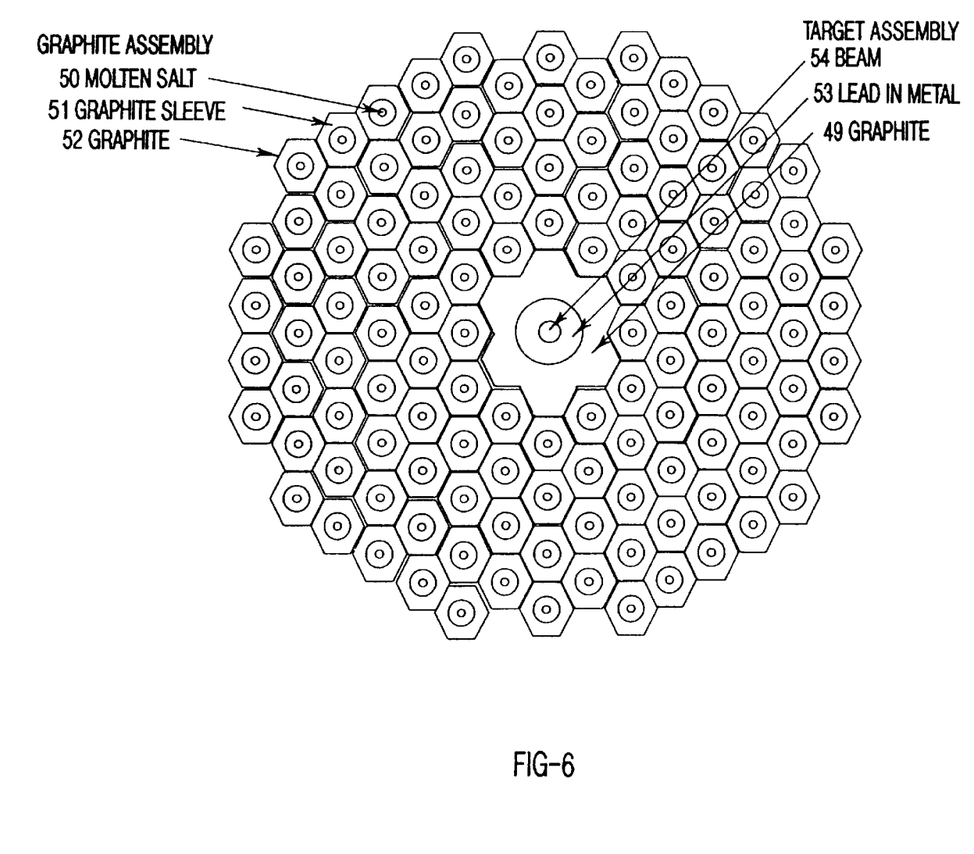
FIG. 6. is a plan view of the core of the system, as shown in FIG. 5, shown in additional detail.

An accelerator-driven system (ADS) for transmutation of commercial nuclear waste is shown in FIGS. 5 and 6. The system is driven by an accelerator in order to start many chains which run for a relatively short time in contrast to a reactor for which the chain runs continuously until the reactor is shut down. The effective multiplication factor $k_{eff}$, which is 1.00 for a continuous chain reactor, is reduced to the range of 0.98–0.95 for which the corresponding chain length is about 50–20 fission events. One significant advantage of this mode is that the neutrons, which otherwise are required to maintain a continuous chain, are put to other uses, in particular, the destruction of nuclear waste. A second benefit is that constraints on reactor design required to keep $k_{eff}=1$ are relaxed and a broader design parameter space is practical. For example, an accidental injection of reactivity which leads to a runaway chain reaction for a reactor with $k_{eff}=1$ is hardly noticed with $k_{eff}=0.96$.

Neutrons are produced via the spallation process by the accelerator beam 31 as it moves through a vacuum 32 and strikes and penetrates a lead or lead-bismuth target 33. The lead is circulated to external heat exchangers 35, 36. Some of these protons strike neutrons or protons in the lead target nuclei and eject them in the forward direction with a lower energy than the incident proton. These second particles of neutrons, and sometimes protons, then strike other particles which are forward moving but with lower energy. This spallation cascade continues until the primary proton and other charged particles come to rest. The total cascade length is approximately one meter for 1-GeV beam energy. In any of these nuclear collisions, the struck nucleus is always excited to some degree and these "hot" nuclides get rid of this excess energy by "boiling off" neutrons. In fact about 90% of the neutrons are produced in boil-off reactions. The boil-off neutrons also are isotropic in contrast to the forward moving direct reaction neutrons. The lead length is longer by about one meter than the limit of primary and secondary proton penetration. The forward moving direct reaction neutrons continue to move downward exciting other nuclides and losing energy in the process. Altogether about 30 neutrons are produced by each 1 -GeV proton.

Most of these neutrons are produced with energies between 0.5 MeV and 5 MeV and slow down by inelastic scattering at higher energies and by elastic scattering in the lead at lower energies. By the time that the neutrons reach the metallic container for the lead 53 (in FIG. 6), which has a larger radius than the radial limit of proton penetration, the neutrons' energy is sufficiently low that neutron damage to the metallic containment vessel for the lead is low enough for acceptable engineering practice. A small component of higher energy neutrons remain and sometimes strike the vessel wall, but the intensity of these neutrons is reduced sufficiently that damage by them to the lead container is acceptable. The radius and length of the lead canister is sufficiently larger than the limits of primary and secondary proton penetration that the neutron production is near the maximum possible and that the energy of the neutron flux striking the wall is reduced sufficiently to limit damage to the container wall to an acceptable level. The production of neutrons by the spallation process and the moderation of the neutrons into the thermal range is an essential feature of embodiments of the present invention described herein.

Neutrons generated via beam-target interactions pass through the container into surrounding graphite 49 and moderate further eventually reaching a thermal temperature in which the neutron spectrum is nearly in equilibrium with the temperature of the graphite. The neutrons move further outward into a blanket made up of vertical hexagonal graphite logs 38, 52 with one or more channels carrying the salt 37, 39, 50 containing the fissile material. The graphite log may also have a removable graphite sleeve inside 51. The assemblies fit into a graphite or HASTELLOY®-N metal, or metal of similar properties, plenum 47 at the bottom. Solid hexagonal graphite assemblies providing a reflector thickness around the outside of about 50-cm are not shown. Between 35% and 60% of the accelerator-produced neutrons start fission chains depending on design details. These chains run for 20–50 fission events before stopping depending on the design details. Therefore if 50% of the accelerator-produced neutrons start a fission chain of length 50 fission events, one 1 GeV proton would generate 30×50× 0.5=650 fission events which corresponds to an energy of 650×0.2 GeV=130 GeV. For a beam current of 6 mA, the fission power level would be 750 MWt.

Heat is dissipated in the medium and is extracted and converted to electric power with a thermal-to-electric efficiency of about 42% made possible by the high (up to about 720 degrees Celsius) operating temperature of the molten salt. Some of this power is fed back to the accelerator, which generally operates with a buss bar efficiency of about 45%. For these numbers, the portion of the generated power required to drive the accelerator is 6/(600×0.42×0.45)= 5.0%. In practice, fewer than 50% of the accelerator-produced neutrons might start fission chains and the fraction of generated power required by the accelerator is usually larger.

Salt flows upward and out of the channels into a shallow pool on top of the graphite and then outward to a circumferential channel above an array of heat exchangers 41 which fill the 360-degree volume below the circumferential channel. Salt flows fast enough that salt fountains 48 form as the salt leaves the channels. The salt is pumped downward 40 through the heat exchangers to the bottom of the tank 46 and across the bottom of the tank before returning through the plenum 47 into the channels in the graphite. The heat is transferred to a second salt of lower melting point than the primary salt which flows into collecting piping 42 surrounding the top of the tank with the piping supported by an appropriate structure 43. A flow of helium gas across the top of the salt pool 45 collects volatile fission product species and carries them through a heated channel (not shown) away from the tank and to a condensation system for separation of different species as required. The overall dimension of the system is about five meters in diameter and about five meters in height.

An embodiment of the present invention includes a fuse system to enhance safety by fail-safe interruption of nuclear power production. A wire with melting point at a temperature higher than that of the salt in normal operation, but lower than the temperature at the threshold for system damage, is placed in the salt trough or other appropriate place. The wire provides a key voltage or current for operating the injector of the accelerator. Melting of the wire by overheat in an accident would result in a short-circuiting of the electricity to the injector and therefore to an instantaneous removal of the proton beam current. A similar wire performing in the same way would be used to sense a malfunction in the liquid lead spallation target and thereby to interrupt automatically the accelerator beam and therefore the power generation.

In order to limit corrosion by the molten salt to an inconsequential level, it is necessary to control the fluoride ion balance in the system. A procedure maybe employed similar to that used at the Oak Ridge National Laboratory in the Molten Salt Reactor Experiment, which incorporated a metal in the molten salt circuit which formed fluoride salt with the excess fluorine.

Features of the present invention are open to modification and include, but are not limited to, fission energy production, removal, and conversion to electric power, processes for removal of volatiles using helium or other gas flow; techniques for fail-safe termination of electric power production using a fusing system for both the molten salt and the liquid lead as part of a safety system; implementation of means for maintaining ion fluoride balance; and halogenization of reactor spent fuel for preparation of the spent fuel for transmutation.

Performance Features

The particular design of the present invention's transmutation system was developed to enable performance in several respects which are not possible with alternative transmutation designs. These features and the comparison with the fast spectrum are discussed briefly below.

Conversion to Non-Weapons Plutonium Part of the reason that the system described here yields a plutonium remnant which is not weapons-useful without implementation of reprocessing is the more favorable cross sections of the thermal spectrum for fissioning the odd isotopes, which are most desirable in weapons material, and for not destroying the even isotopes, which are not desirable in weapons material. By contrast, the fast spectrum incorporated in alternative designs destroys by fission both even and odd isotopes without significant discrimination. The plutonium remnant from transmutation in a fast spectrum is therefore necessarily much more weapons-useful than the remnant from thermal spectrum transmutation.

Production of a New Type of Weapon-Useful Material during Transmutation

The nucleus $^{242m}$Am has a thermal cross section for fission ten times higher than that for $^{239}$Pu. It also releases more neutrons per fission than $^{239}$Pu and features a cross section dependence on neutron energy favorable for certain types of nuclear explosives. Because it has such a high thermal cross-section for fission, it is virtually non-existent in LWR spent fuel. It is destroyed soon after it is produced in the LWR because of its large thermal fission cross section. Any $^{242m}$Am produced in the thermal spectrum transmuter is destroyed even more rapidly than in a LWR. In transmutation of LWR waste in fast spectrum systems, $^{242m}$Am is created but it is not destroyed nearly as readily as in the thermal spectrum. In addition it is produced with about three times greater likelihood from neutron capture on $^{242}$Am in the fast spectrum than in the thermal spectrum. The result is that $^{242m}$Am is produced in significant quantities in a fast spectrum transmuter but it is not produced in a thermal spectrum transmuter. Therefore, proliferation of nuclear weapons material may be a concern in regard to $^{242m}$Am for the fast spectrum but not for the thermal spectrum.

Inventory of Actinide Required for Transmutation

Weapons-useful material is made inaccessible to a significant degree when it is in spent fuel assemblies prior to transmutation. It is confined in a case of metal cladding and removal from spent fuel assemblies system is further deterred by the gamma radioactivity of the spent fuel. Once the integrity of the spent fuel has been destroyed and transmutation begun, weapons material can in principle be recovered at any point in the transmutation process. The larger the concentration of plutonium and the greater the amount of plutonium carried in the system, the easier it is to recover. The high thermal cross section for fission makes it possible to transmute waste in a thermal spectrum with a minimum of weapons-useful inventory. For a fast spectrum the inventory required for transmutation is ten to thirty times higher. Of course there is no weapons-useful material in the present invention; it is only accessible potentially during the time interval between destruction of the spent fuel assemblies and entry into the transmuter. For the fast spectrum, weapons-useful plutonium is accessible before transmutation, during transmutation if the transmuter is stopped for removal of its inventory, and during the reprocessing and fuel refabrication steps.

Reactivity Stability during Transmutation and Required Fission Power

The system of the present invention maintains constant reactivity by the use of liquid fuel and the constant inflow and removal of actinide and/or fission product. The only fission energy produced is that from the fission of the LWR waste being destroyed. Solid fuel systems cannot maintain stability since fissile material is burned up and not replaced. To more nearly approach stability in solid fuel systems, fissile material is produced and partially burned by breeding from $^{238}$U or $^{232}$Th. While stability is improved, as much as half of the fission energy produced is from the bred fissile material ($^{233}$U or $^{239}$Pu). Therefore, the fission power per kilogram of commercial plutonium destroyed is twice as high as in a liquid fueled system. Consequentially, the capital investment in facilities is also twice as high as in a liquid fueled system to destroy the weapons useful material at the same rate.

Reactivity Stability during Transmutation and Accelerator Power

Some of the instability in reactivity of a solid fueled system still remains even when including breeding of fissile material from $^{238}$U or $^{232}$Th. The reactivity changes sufficiently in spite of the breeding to require a change in accelerator power by a factor of about two to maintain constant fission power. Therefore, the accelerator operates only about half of the time at its highest power level. The capital Investment in the accelerator Is only used half of the time. For the liquid fueled system, reactivity is constant and the accelerator operates at full power all of the time. In addition the power of the accelerator is proportional to the fission power which is twice as large per kilogram of plutonium destroyed for a solid fueled system as for a liquid fueled system. Taken together, the accelerator capital investment for destroying a given amount of plutonium is four times as large for a solid-fueled system as for a liquid-fueled system.

Removal of Some of the Metallic Fission Products

Many of the fission products combine with free fluorine in the salt and form fission product fluoride salt, which circulate with the carrier salt. However, several of the metallic fission products instead deposit on metallic surfaces. In a preferred embodiment of the present invention, virtually the entire metallic surface is in the heat exchangers. These fission products are, therefore, deposited where they do not parasitically absorb neutrons and spoil the neutron economy. After several years, the fission products accumulate sufficiently that the performance of the heat exchanger is compromised, at which point the heat exchanger is replaced. Therefore, the design of the present invention includes means for fast and easy replacement of the internal heat exchangers.

System Application

Figure 7:
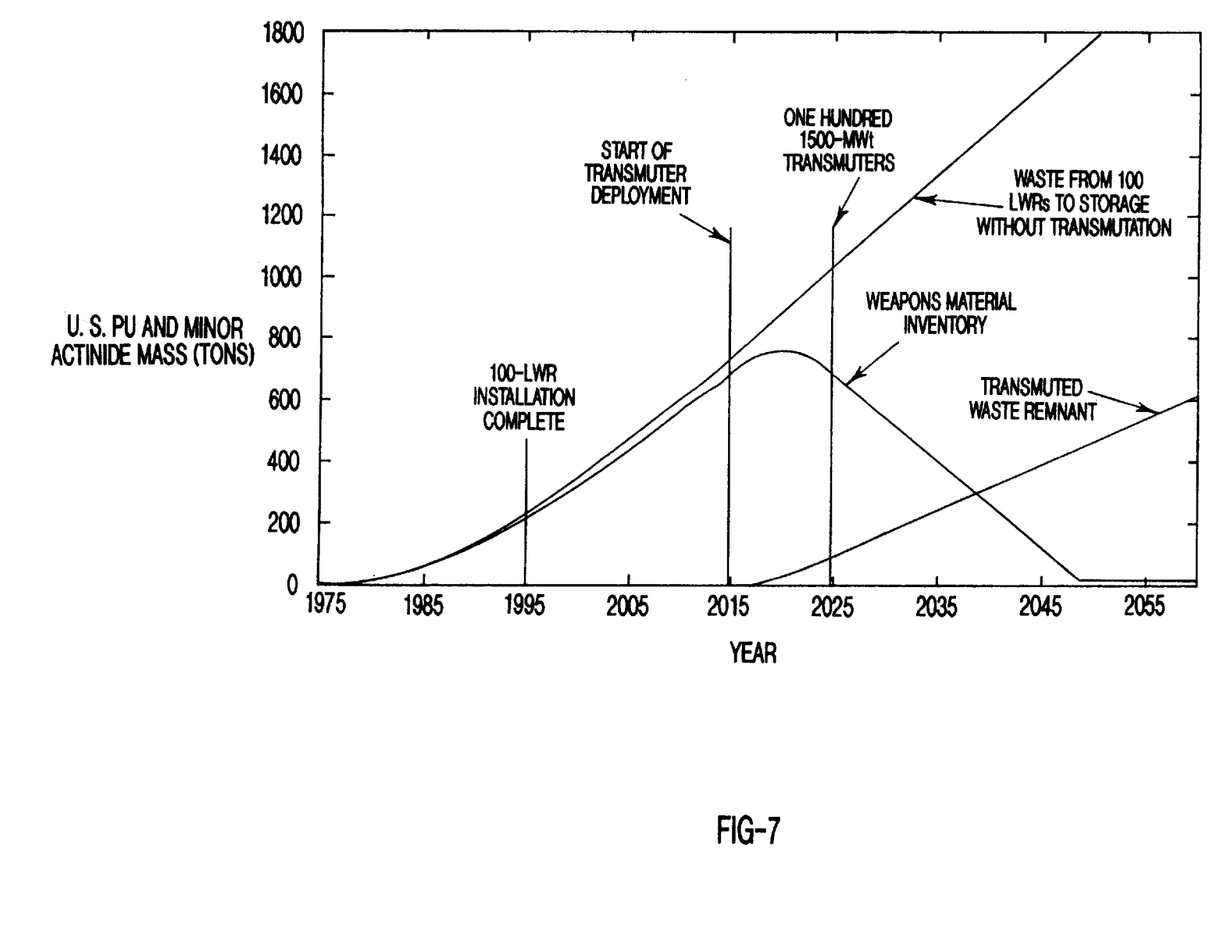
FIG. 7 is an illustration of the performance of the present invention for the purpose of destroying weapons-useful material for the scenario of close-out of a fleet of 100 light water nuclear power reactors.
Figure 8:
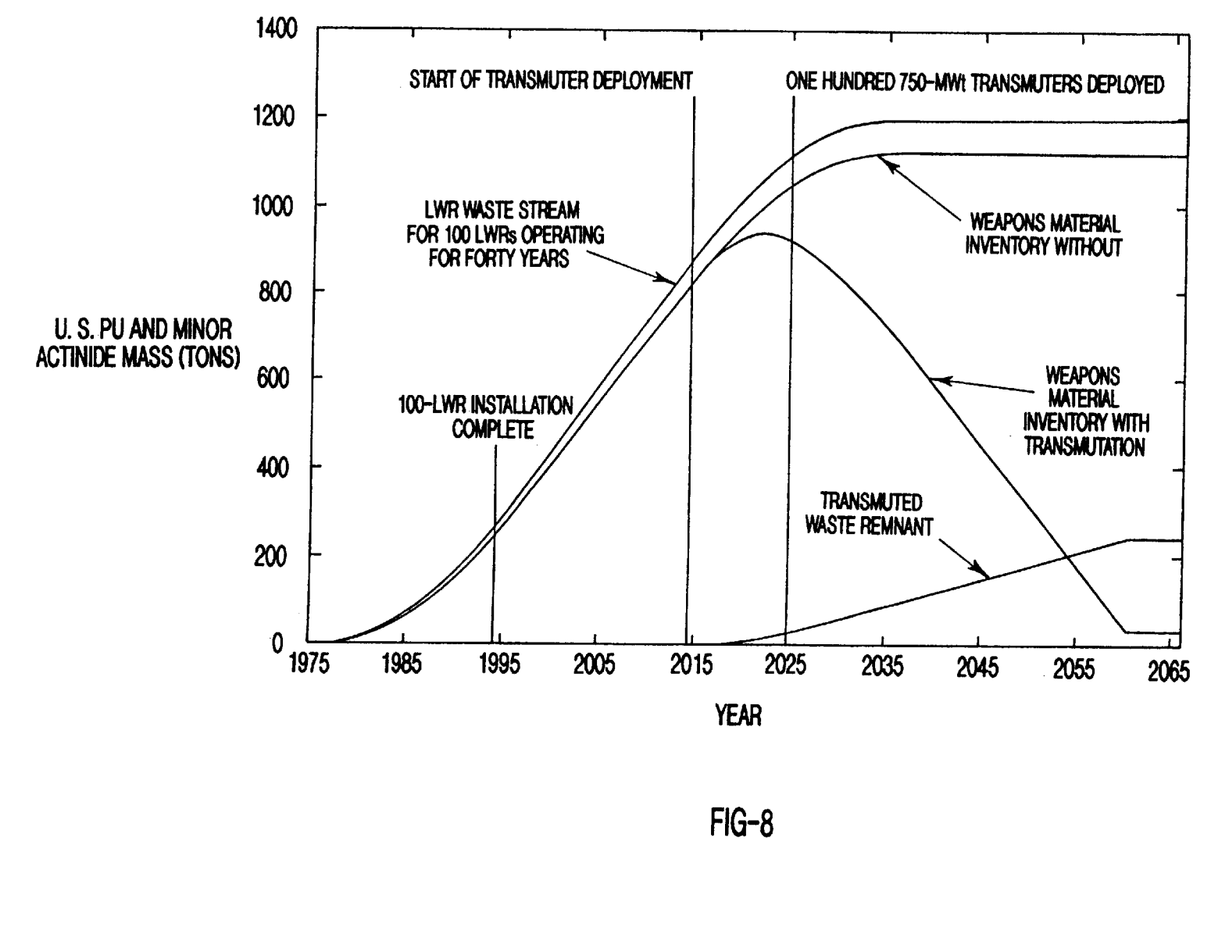
FIG. 8 is an illustration of the performance of the invention with for the purpose of destroying weapons-useful material in the waste from a 100-unit fleet of light water nuclear power reactors operated indefinitely.

The application of the system to two scenarios is shown in FIGS. 7 and 8. These calculations assume that only PMA from LWR fuel is added to the transmuters.

Nuclear Energy Growth through Transmutation; 100 LWR Deployment

The impact of the deployment of the transmuters on the inventory of PMA from a 100-LWR fleet is shown in FIG. 7 where the arrest in the growth of these materials and the reduction to a minimum equilibrium quantity is presented. The figure assumes an indefinitely long deployment of one hundred 3000-MWt LWRs made partly possible by transmutation deployment. Without transmutation, the inventory of Pu and minor actinide waste would grow by 2050 to about 1800 tons total from these LWRS. For simplicity it is assumed that the LWRs were deployed at the rate of five per year for twenty years with deployment beginning in 1975. It is assumed also that the transmutation technology would be ready for deployment by 2015. If one 750-MWt transmuter were deployed for each LWR, it would only stop the growth in PMA waste or weapons-useful material at a national inventory of about 1000 tons. To eliminate the potential weapons from this material would require as shown in FIG. 7 a system twice as large using a 1500-MWt version of the Tier 1 technology (or two 750-MWt systems per LWR). The curves assume the deployment of the Tier 1 1500 MWt transmuters at the rate of 10 per year between 2015 and 2025. By the year 2050, the weapons material is brought under control. The reduction of the weapons material is therefore achieved in about one human generation. The only weapons material left is the untransmuted neptunium remaining in the transmuters and in the transmuted waste remnant.

The deployment of these transmutation systems would increase the nuclear power by 50% during the 35-year burn-down period. After that point the 100 ADS deployment, if retained, would be twice as large as necessary. The ADS fleet could be maintained to accommodate the waste from an increase from the 100 LWR fleet to 200 LWRS. In this event the nuclear power output would grow by a factor of 2.5 without the presence of weapons-useful material in geologic storage.

Nuclear Energy Close-Out Option; 100 LWR Fleet

FIG. 8 presents the nuclear closeout option for nuclear power using transmutation. One hundred 750-MWt transmuters are deployed between 2015 and 2025, which would allow about 16 years for development and demonstration of the transmutation technology. The upper curve shows the production of nuclear waste without transmutation assuming that the LWR lifetime is 40 years. The curve below shows the build up of weapons useful material that is mostly plutonium but also includes the neptunium. The next curve shows the time dependence for the reduction of the weapons material that is reduced by a factor of about 50 in about 40 years. The lowest curve shows the accumulation of transmuted PMA which is free of weapons material and which is reduced by a factor of about 5 below that of the untransmuted waste stream. This material is either sent to geologic storage or to similar transmuters with backend separations where the actinide content is reduced by an additional factor of 200 for a total actinide reduction factor of 1000.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A subcritical reactor apparatus, said apparatus comprising:
    a vessel, said vessel comprising a shell and an internal volume;
    graphite, said internal volume housing said graphite;
    means for introducing neutrons into said internal volume;
    a fluid medium comprising molten salts and at least one member selected from the group consisting of plutonium and minor actinide waste and fission products wherein absorption of the neutrons in said fluid medium after thermalization forms a processed fluid medium through a plurality of fission chains comprising chains averaging approximately 10 fission events to approximately 100 fission events and wherein said fluid medium is introduced and said processed medium is removed from said internal volume at rates sufficient to maintain a substantially isotopic equilibrium in said processed fluid medium in said internal volume; and
    wherein said apparatus excludes a back-end chemistry process for chemical separations of fission products or other species.

2. The apparatus of claim 1 wherein said molten salts comprise at least one member selected from the group consisting of fluoride salts and chloride salts.

3. The apparatus of claim 1 wherein said molten salts comprise at least one member from the group consisting of NaF and $ZrF_4$.

4. The apparatus of claim 1 wherein said fluid medium is introduced into said vessel by at least one member selected from the group consisting of continuous introduction and periodic introduction.

5. The apparatus of claim 1 wherein said processed fluid medium is removed from said reactor vessel by at least one member selected from the group consisting of continuous removal and periodic removal.

6. The apparatus of claim 1 additionally comprising means for removing volatile material from at least one member selected from the group consisting of said vessel, sad fluid medium and said processed fluid medium.

7. The apparatus of claim 1 wherein the processed fluid medium comprises a plutonium concentration less than that of the introduced fluid medium.

8. The apparatus of claim 1 wherein the processed medium comprises less than approximately 0.1 mole percent of $^{242m}Am$.

9. The apparatus of claim 1 wherein said fission chains comprise averages from approximately 20 fission events to approximately 40 fission events.

10. The apparatus of claim 1 wherein said means for introducing neutrons comprises at least one high energy particle beam and at least one target material.

11. The apparatus of claim 10 wherein said target material comprises at least one member selected from the group consisting of molten salt, lead and bismuth.

12. The apparatus of claim 1 wherein said graphite comprises at least one member selected from the group consisting of a solid graphite matrix and pieces of graphite.

13. The apparatus of claim 12 wherein said graphite comprises at least 80% of said internal volume of said vessel.

14. The apparatus of claim 1 wherein said shell of said vessel comprises metal.

15. The apparatus of claim 1 additionally comprising means for recovering energy released by fission events.

16. The apparatus of claim 15 wherein said means for recovering energy comprises at least one heat exchanger contained within said internal volume of said vessel.

17. The apparatus of claim 16 wherein said heat exchanger comprises a metal heat exchange surface for heat transfer and fission product deposition.

18. The apparatus of claim 15 wherein energy recovered from fission events provides energy for said means for introducing neutrons.

* * * * *